Patented Dec. 4, 1928.

1,694,219

UNITED STATES PATENT OFFICE.

LLOYD E. JACKSON AND HELEN E. WASSELL, OF PITTSBURGH, PENNSYLVANIA, ASSIGNORS TO MUNDATECHNICAL PRODUCTS COMPANY, OF DETROIT, MICHIGAN, A CORPORATION OF DELAWARE.

MOTHPROOFING SUBSTANCE AND METHOD OF PREPARING IT.

No Drawing.   Application filed November 18, 1927. Serial No. 234,290.

Our invention is found in the preparation of an insectifuge, a substance for preventing insect attack. One specific application which we shall consider in an exemplary way is that of rendering woolen clothing and animal fibre generally and articles formed of animal fibre, such as fur, feathers, and fabrics of various sorts, immune to the attacks of clothes moths.

In Letters Patent of the United States, No. 1,615,843, granted February 1, 1927, we have described in generic terms the use of the cinchona alkaloids and their derivatives, for the purposes just indicated. And in those Letters Patent we have claimed the cinchona alkaloids generally and quinidine in particular, and their use in this connection. Our further investigations have revealed to us the peculiar potency of another member of the class of substances named—quinoidine, to wit—for these purposes, and we have discovered how quinoidine may be prepared for such use. In an application filed December 31, 1926, Serial No. 158,403, we have described and claimed the fatty acid salts of quinoidine and quinoidine derivatives. In this application we shall describe and claim the method of preparing for industrial use solutions containing quinoidine.

The source of cinchona alkaloids is the bark of cinchona trees. The bark is gathered, dried, and ground, after which it is mixed with slaked lime and water to form a paste. The paste is dried and extracted with hot petroleum distillate. The alkaloids dissolved by the distillate are removed from it by means of dilute sulfuric acid. From the acid solution of the mixed alkaloids the crystalline alkaloids quinine, quinidine, cinchonine, and cinchonidine are removed. The residue contains a mixture from which over twenty different alkaloids have been isolated from various species of cinchona. This mixture of alkaloids may be precipitated by adding caustic soda solution to the acid residual solution. The mixture is termed quinoidine.

Quinoidine may be defined as a mixture of amorphous alkaloids found in cinchona bark which remains in solution in an acid extract, after the crystalline alkaloids have been removed. It differs from the other substances named, quinine, quinidine, cinchonine, and cinchonidine, in that it is a compound substance of indefinite and variable composition, and it differs also in that it does not crystallize from solution. It is a very bitter, brownish black mass of lustrous, resinous appearance, and has a conchoidal fracture. Quinoidine is a basic material, which as we have discovered forms salts with various inorganic and organic acids.

Quinoidine is an article of commerce for which there are limited uses. It is used to some extent as a rubber accelerator, but the requirements in the rubber industry are inadequate to the supply of quinoidine available. Quinoidine is much cheaper than the crystallizable alkaloids. Quinoidine may be purchased at $.15 to $.25 per pound, whereas the price of the crystallizable alkaloids ranges from $3.50 to $6.75 per pound. Quinoidine is little used in medicine, whereas the crystallizable products have hitherto been used chiefly for that purpose.

Quinoidine and quinoidine salts form dark brown solutions and our first discovery is that these solutions may, by means of activated carbon, be partially or completely decolorized. This discovery, that the solutions may be decolorized, is of considerable practical importance, because in moth-proofing (and moth-proofing is one of the commercial uses which we contemplate) it is desirable not to change appreciably the color of the article treated, although the color may be a delicate one. Our further discovery concerns the preparation of quinoidine for the purpose indicated.

Quinoidine salts may be prepared which are variously soluble, in water or in organic solvents, by choosing the proper acid for reaction with the quinoidine base. For solution in organic solvents the salts of the higher fatty acids are suitable. Quinoidine oleate is a typical fatty acid salt.

Quinoidine oleate may be prepared by dissolving 1 part of quinoidine in 2 or more parts of oleic acid, by weight. The quinoidine is ground to a powder and stirred into the oleic acid, which in order to obtain ready reaction and quick solution should be heated to at least 60° C. The reaction may take place at room temperature, but does not do so as rapidly as when the oleic acid is heated. The reaction between quinoidine and oleic acid may be facilitated, either by dissolving the quinoidine preliminarily in ethyl alcohol, or by mixing ethyl alcohol with the oleic acid previous to stirring the powdered alkaloid into it.

Quinoidine reacts with oleic acid in the proportion of approximately 10 parts quinoidine to 7 parts oleic acid, to form quinoidine oleate. The product obtained by mixing 1 part quinoidine with 2 or more parts of oleic acid is a solution of quinoidine oleate in oleic acid, or, if alcohol be present, in oleic acid and ethyl alcohol.

The product is an oily, syrupy, amorphous material which is soluble in ethyl alcohol, benzene, ethyl ether, petroleum naphtha, kerosene, etc. These solvents (all more fluid than oleic acid) we characterize as "anhydrous", and in this art anhydrous solvents are such as, penetrating the fibre to which they may be applied, have no effect to cause the fibre to swell. They may, some of them, contain a relatively small quantity of water. The operation of decolorizing with activated charcoal, mentioned above, may be performed upon the solution otherwise ready for use— in this case the solution of quinoidine oleate in a dry solvent.

Quinoidine stearate may be prepared in like manner as the oleate, by using stearic instead of oleic acid. The stearate is more viscous than the oleate. Other fatty acid salts or mixtures of fatty acid salts may be prepared in like manner as the oleate and the stearate. They are all amorphous, sticky substances with properties similar to those of the oleate and stearate.

A mixture of a quinoidine salt of a fatty acid with sodium, potassium, or ammonium soap may be prepared by neutralizing a portion of a given quantity of fatty acid, say approximately two thirds, with a suitable water or ethyl alcohol solution of an alkaline base such as sodium hydroxide, potassium hydroxide, ammonium hydroxide, sodium carbonate, potassium carbonate, sodium phosphate, potassium phosphate, etc., and then adding sufficient quinoidine to neutralize the balance of the fatty acid. The quinoidine may be conveniently added as solution in ethyl alcohol. To produce a concentrated product the most of the water and alcohol may be evaporated. The product obtained is a thick paste or soap-like mass readily dispersable in water. Water dispersions of the mixture are particularly adapted as insectifuges, and, by way of example, for moth-proofing materials made of wool, fur, or feathers.

We have furthermore discovered that the fatty acids themselves have insect repelling properties, particularly moth-proofing properties. We have found, however, that fatty acids alone are liable to deterioration; and we contemplate making application for Letters Patent, protecting us in the enjoyment of our invention in preparing fatty acids to resist such deterioration. We here are concerned to note that a mixture of a quinoidine salt of a fatty acid with fatty acid is a more effective insectifuge than quinoidine otherwise prepared, because of the fact that both of the substances in the mixture are active. Fatty acids containing some quinoidine salt of a fatty acid are more effective insectifuges than fatty acids prepared without such content; and a quinoidine salt of a fatty acid containing an excess of fatty acid is a more effective insectifuge than the quinoidine salt otherwise prepared.

Turning from the particular subject of moth-proofing to the general subject of insectifugse mentioned at the outset, it remains to say that our preparation is useful for preventing the attacks of carpet beetles upon carpets, for example, and book lice upon paper, cigarette beetles upon furniture, garments, etc. And generally speaking our preparation will be found to be destructive of insect life and preventive of insect activity.

We claim as our invention:

1. The method herein described of preparing a solution containing quinoidine for use as an insectifuge, which consists in decolorizing the solution with activated charcoal.

2. The method herein described of preparing a solution containing quinoidine for use as an insectifuge, which consists in grinding to powder a quatity of quinoidine, stirring the powder into liquid acid, and dissolving the product of reaction in a liquid solvent.

3. The method herein described of preparing a solution containing quinoidine for use as an insectifuge, which consists in grinding to powder a quantity of quinoidine, stirring the powder into a quantity of hot fatty acid, and dissolving the product of reaction in a dry solvent.

4. The method herein described of preparing a solution containing quinoidine for use as an insectifuge, which consists in combining a quantity of quinoidine and a quantity of fatty acid in the presence of ethyl alcohol, and dissolving the product of reaction in a dry solvent.

5. The method herein described of preparing a solution containing quinoidine for use as an insectifuge, which consists in grinding to powder a quantity of quinoidine, stirring the powder into a mixture of fatty acid and ethyl alcohol, and dissolving the product of reaction in a dry solvent.

6. The method herein described of preparing a solution containing quinoidine for use as an insectifuge, which consists in combining quinoidine and a fatty acid, dissolving in a dry solvent the product of reaction, and decolorizing the solution with activated charcoal.

7. An insectifuge containing a mixture of a quinoidine salt with a soap.

8. An insectifuge consisting of a dispersion in water of the substance defined in claim 7.

9. An insectifuge containing a mixture of the quinoidine salt of a fatty acid with a soap.

In testimony whereof we have hereunto set our hands.

LLOYD E. JACKSON.
HELEN E. WASSELL.